3,594,360

QUATERNARY CATALYST SYSTEM FOR
BUTADIENE POLYMERIZATION
Rudolf H. Gaeth, Lake Jackson, Tex., assignor to
Phillips Petroleum Company
No Drawing. Filed May 29, 1969, Ser. No. 829,108
Int. Cl. C08d 3/06
U.S. Cl. 260—94.3                                    8 Claims

ABSTRACT OF THE DISCLOSURE

A polybutadiene composition possessing broad molecular weight distribution and easily controllable microstructure varying from a high cis to a high vinyl configuration is fashioned in a single direct polymerization system by employing a novel catalyst containing a nickel compound, lithium aluminum hydride or an organometallic compound, a fluoride compound, and a molybdenum compound.

---

This invention relates to the process for polymerizing 1,3-butadiene. In another aspect, this invention relates to a novel polymerization catalyst which can be used in a process for directly polymerizing 1,3-butadiene in a single polymerization system to a polybutadiene composition possessing broad molecular weight distribution. In still another aspect, this invention relates to a process for easily controlling the microstructure of a polybutadiene composition from a high cis to a high vinyl configuration.

It has now been discovered that by the addition of a hydrocarbon soluble molybdenum compound to the known catalyst system containing a nickel compound, an organometallic compound, and a boron fluoride compound, a surprisingly novel catalyst is produced which possesses unusual and versatile properties. It has been discovered that it is now possible when using this quaternary catalyst system to produce polybutadiene elastomers with controlled microstructure and controlled molecular weight by a direct polymerization process in a single polymerization system.

It is an object of this invention to provide a novel catalyst system for the production of a polybutadiene composition possessing broad molecular weight distribution. It is another object of this invention to provide a process for directly polymerizing 1,3-butadiene in a single polymerization system to a polybutadiene composition possessing broad molecular weight distribution. It is a further object of this invention to provide a process for easily controlling the microstructure of a polybutadiene composition from a high cis to a high vinyl configuration and obtaining a broad molecular weight distribution in the polymer composition by employing a single polymerization system.

According to this invention, a four-component catalyst system which forms on mixing a nickel component; an organometallic compound or lithium aluminum hydride; at least one of the members selected from boron trifluoride, boron trifluoride-ether complex, or hydrogen fluoride; and a hydrocarbon soluble molybdenum compound is employed to catalyze the polymerization of 1,3-butadiene. This catalyst system enables the production of a polybutadiene composition possessing broad molecular weight distribution in a single polymerization system while also controlling the microstructure of the polybutadiene composition. As hereinbefore stated, the addition of the molybdenum compound as the fourth component provides a versatile catalyst for the production in situ of a polymer blend. By varying the mole ratios of the catalyst components and the time of the addition of the fluoride compound and/or the molybdenum compound, the microstructure of the polybutadiene composition can be controlled as desired.

Molecular weight distribution is well recognized in the art as an important parameter in the characterization of polymers. In elastomers, for example, this parameter is known to influence polymer processability and heat buildup. One commonly employed method of expressing molecular weight distribution is in the form of a ratio $M_w/M_n$ wherein $M_w$ equals weight average molecular weight and $M_n$ equals the number average molecular weight. This ratio has a theoretical minimum value of 1. The polymer possessing a $M_w/M_n$ ratio of 1 is said to be monodisperse. Broadness of molecular weight distribution, or polydispersity, is then reflected by the value of this ratio, i.e., the larger the number the broader the molecular weight distribution, or the greater the polydispersity. Heterogeneity index (H.I.) is employed as a synonymous expression for polydispersity in the ratio of $M_w/M_n$ when this ratio value is obtained by gel permeation chromatography.

In recent years gel permeation of chromatography (GPC) has been developed as a polymer fractionation method which is both rapid and reliable in providing values for molecular weight distribution. The quaternary catalyst system of this invention when employed for the polymerization of butadiene produces a polybutadiene with a heterogeneity index of at least 3.0.

The nickel compounds employable according to this invention include metallic nickel having a large surface area for its weight or reducible nickel compound. When metallic nickel is used it should be in the form of a colloid, fine powder, or porous solid such as reduced nickel adhered to carriers or Raney type nickel. The nickel compounds used in this invention are those nickel compounds that are capable of being reduced by the hereinafter described organometallic compounds. Suitable nickel compounds include nickel oxide, nickel salts of inorganic acids and organic acids containing 2 to 20 carbon atoms, nickel salts of beta-diketones that can be represented by the following formula:

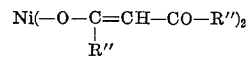

wherein R″ is a saturated aliphatic, saturated cycloaliphatic or aromatic hydrocarbon radical, or combinations thereof containing from 1 to 10 carbon atoms, and complex compounds such as dicyclopentadienylnickel, and the nickel complex with the ethyl ester of the acetoacetic acid. Examples of suitable nickel salts include the nickel salts of hydrochloric acid, hydrobromic acid, hydroiodic acid, sulfuric acid, nitric acid, phosphoric acid, caprylic acid, capric acid, lauric acid, myristic acid, palmitic acid, stearic acid, arachidic acid, cyclobutane carboxylic acid, cyclohexane carboxylic acid, benzoic acid, 2-naphthoic acid, and the like. Examples of suitable nickel salts of the beta-diketones include the nickel salts of 2,4-pentanedione (acetylacetone), 3,5-heptanedione, 1,5-dicyclopentyl-2,4-pentanedione, and the like. Mixtures of the foregoing nickel components can also be used. Nickel compounds that can be reduced with lithium aluminum hydride or the organometallic compounds are preferred. Nickel compounds that are preferred are those which are substantially soluble in hydrocarbon diluents used in the polymerization, such as the nickel salts of fatty acids and naphthenic acids. Through a proper choice of catalysts component, a completely soluble catalyst system is obtained.

It is within the scope of this invention to utilize nickel components that are supported on various carriers such as diatomaceous earth, silica-alumina, silica, alumina, titania, zirconia, kaolin, ion-exchange resins, and the like. The metallic nickel or the reducible nickel compounds, such as the nickel oxides, and the like, can be supported on the above-mentioned carriers.

The organometallic compounds and lithium aluminum hydrides that can be used in this invention are compounds having the formula $R_mAlCl_n$, $LiAlH_xR_{(4-x)}$, or $R_yM$, wherein R is a saturated aliphatic, saturated cycloaliphatic, or aromatic hydrocarbon radical, or combinations thereof, containing from 1 to 20 carbon atoms, m and n are integers of 1 or 2 such that $m+n=3$, x is an integer of from 0 to 4, M is lithium, sodium, potassium, rubidium, cesium, beryllium, magnesium, zinc, cadmium, aluminum, gallium, or indium, and y is an integer equal to the valence of M. Mixtures of the foregoing organometallic compounds can be employed. Examplary examples include trimethylaluminum, triethylaluminum, triisobutylaluminum, tri-n-eicosylaluminum, triphenylaluminum, methylaluminum sesquichloride, ethylaluminum sesquichloride, lithium aluminum dimethyl dihydride, lithium aluminum butyl trihydride, lithium aluminum tri-n-decyl hydride, lithium aluminum-n-eicosyl trihydride, lithium aluminum tetraethyl, lithium aluminum tetrabutyl, n-butyllithium, 4-tolyaluminum dichloride, diphenylaluminum chloride, 2-naphthyllithium, diethylmagnesium, diphenylmagnesium, trimethylgallium, diethylphenylgallium, tribenzylgallium, 4-methycyclohexylpotassium, benzyllithium, n-eicosyllithium, phenylsodium, cyclohexylpotassium, isobutylrubidium, n-nonylcesium, diethylberyllium, diphenylberyllium, diethylzinc, dicyclopentylzinc, di-n-propylcadmium, trimethylindium, triphenylindium, and the like.

The organometallic compounds are preferred over the lithium aluminum hydrides and of the other organometallic compounds the organoaluminum compounds, including organoaluminum chlorides, and various mixtures of these compounds, are preferred.

The fluoride compound that can be employed according to this invention is at least one member selected from boron trifluoride, hydrogen fluoride, or a boron trifluoride-ether complex.

Molybdenum compounds employable according to this invention can be represented by the general formula $$MoX_3[R'—(Z—)_t]_q$$

wherein X is a halogen, i.e., fluorine, chlorine, bromine, or iodine, and $R'—(Z—)_t$ is a mono- or difunctional ligand wherein the functional group —(Z—) of said ligand is selected from —($CO_2$—), —(O—), —(S—), and

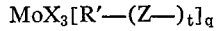

and wherein t is an integer of 1 or 2 and when t equals 1, R' is a saturated or unsaturated aliphatic or cycloaliphatic hydrocarbon radical or an aromatic hydrocarbon radical, or combinations thereof, containing from 1 to 30 carbon atoms and when t equals 2, R' is a divalent radical of the same type and of the same range and number of carbon atoms as when t equals 1. R''' is a saturated or unsaturated aliphatic or cycloaliphatic hydrocarbon radical or a hydrocarbon aromatic radical or combinations thereof, containing from 1 to 12 carbon atoms; and wherein q is an integer of 1 or 2 such that when t equals 1, q equals 2, and when t equals 2, q equals 1.

The above molybdenum catalyst component can be prepared by the reaction of $MoX_5$, preferably $MoCl_5$, with compounds of the type $R'—(COH_2)_t$, $R'—(OH)_t$, $R'—(SH)_t$, and

in an inert halogenated hydrocarbon diluent such as chloroform, carbon tetrachloride, tetrachloroethane, or the like, or a hydrocarbon diluent such as n-hexane, n-pentane, cyclohexane, benzene, toluene, xylene, or the like. Alternatively alkali metal salts of the above compounds e.g., $R'—(CO_2Na)_t$, can also be reacted with $MoX_5$ to produce the desired molybdenum-containing catalyst component. Examples of suitable compounds for the preparation of the molybdenum-containing catalyst component from compounds of the $R'—(CO_2H)_t$ type are acetic acid; propionic acid; malonic acid; adipic acid; o-phthalic acid; 9,10-anthracenedicarboxylic acid; 1,2-cyclooctanedicarboxylic acid; 4,5-di-(n-dodecyl)-o-phthalic acid; and the like. Exemplary compounds of the $R'—(OH)_t$ type are methanol; ethylene glycol; ethanol; 1-butanol; 1,4-butanediol; 1-hexanol; 1-dodecanol; 1-tricosanol; 1,8-octanediol; 1,3-cyclohexanediol; 1,2-cyclododecanediol; 4,8-di - (n-nonyl)-1,2-cyclododecanediol; phenol; 1-naphthol; 1,3-naphthalenendiol; 4-cyclohexylphenl; 4-n-dodecylphenol; and the like. Exemplary compounds of the $R'—(SH)_t$ type are methanethiol; 1-butanethiol; 1-dodecanethiol; cyclododecanethiol; 1-tricosanethiol; thiophenol; 1-naphthalenethiol; 1,5-pentanedithiol; 1,2-benzenedithiol; 4,5-di(n-dodecyl)-1,2-benzenedithiol; 1,2-cyclooctanedithiol; 4,5-diphenyl-1,2-cyclohexanedithiol; and the like. Exemplary compounds of the

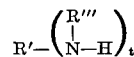

type are dimethylamine; N-methyldodecylamine; N-dodecyltricosanylamine; diethylamine; dihexylamine; didecylamine; N-cyclohexylaniline– dibenzylamine; N,N'-dibutyl-1,2-diaminobenzene; N,N'-dicyclohexyl - 1,2 - diaminoethane; N,N'-diphenyl-1,2-diaminocyclooctane; N-butyl-N'-cyclohexyl-1,4-diaminobutane; and the like.

Numerous variations in operating procedure can be employed when polymerizing 1,3-butadiene in the presence of the 4-component catalyst system of this invention. Charge sequence for diluent, monomer and the catalyst system can be in any order. It is preferred that the diluent be charged first and the monomer following. It is also preferred that the molybdenum or boron component (or hydrogen fluoride) be added last. In one method of operation the diluent, monomer, nickel compound, organometallic compound or lithium-aluminum hydride compound, and the boron compound or hydrogen fluoride are charged initially. The molybbenum compound is then added after the polymerization has started. The type of product is governed by the time of addition of the fourth component and is selected according to the composition of the desired microstructure. In another method of operation the boron compound or hydrogen fluoride is added after the polymerization has started and at such time as to give the desired product.

By varying the catalyst level, the ratio of catalyst components, and the method of operation, the molecular weight, the molecular weight distribution and the microstructure of the polybutadiene can be controlled. The addition of the fourth catalyst component, i.e., molybdenum compound affords a method for converting a catalyst system that gives only a high cis polymer to one that produces a polymer blend in which the components range from predominantly cis to predominantly vinyl polymers in a single polymerization system while dually controlling molecular weight and the molecular weight distribution of the polymeric product produced. If necessary to modify the catalytic function of the catalyst system, aging or heat-treating of the catalyst may be carried out by employing various of the catalytic components.

The catalyst level of the quaternary catalyst system of this invention is based on the nickel component. The nickel component is generally provided in sufficient amount to provide in the range of 0.5 to 5 gram atoms of nickel per 100 grams of monomer employed. The preferred amount of the nickel component is generally in the range of 0.75 to 2.5 gram atoms of nickel per 100 gram atoms of monomer. The amounts of the other three catalytic components are then related to the nickel. The amounts of the lithiumaluminum hydride or organometallic compounds is generally in the range of about 3 to 5 moles per gram atoms of nickel. The amount of boron compound or hydrogen fluoride is in the range of about 0.5 to 7 moles per gram atom of nickel. The amount of molybdenum compound is in the range of about 1 to 3 moles per gram of nickel.

The polymerization is generally carried out in the presence of an inert hydrocarbon diluent. Paraffinic, cycloparaffinic, and aromatic hydrocarbons containing from about 4 to 10 carbon atoms are suitably employed. Exemplary are n-pentane, n-hexane, isooctane, cyclohexane, benzene, toluene, mixtures thereof, and the like. It is generally desirable to carry out the polymerization at a sufficient pressure so that at least a portion of the 1,3-butadiene monomer is in the liquid phase. Polymerization is usually carried out at a temperature in the range of about −20 to 250° F. with a temperature in the range of 50 to 200° F. preferred.

Illustrative of the foregoing discussion and not to be interpreted as a limitation on the scope thereof or on the ingredients herein employed the following examples are presented.

EXAMPLE I

The effect of molybdenum trichloride distearate in a catalyst system containing nickel naphthenate, triethylaluminum, and boron trifluoride etherate (BF$_3$-ethyl ether complex) for the polymerization of butadiene was determined. Two series of runs were made using a different charge order and variable amounts of BF$_3$-etherate in each series. The polymerization recipe was as follows:

| | |
|---|---|
| 1,3-butadiene, parts by weight | 100. |
| Cyclohexane, parts by weight | 780. |
| Nickel naphthenate, m.h.m | 1.0 |
| Triethylaluminum (TEA), m.h.m | 3.5. |
| Molybdenum trichloride distearate (MoCl$_3$St$_2$), m.h.m. | 2.0. |
| BF$_3$ etherate, m.h.m.[1] | Variable. |
| Temperature, °F | 122. |
| Time, minutes | 50. |

[1] M.h.m = gram millimoles per 100 grams monomer.

The molybdenum trichloride distearate employed was prepared by reacting stearic acid with molybdenum pentachloride in cyclohexane. The recipe was as follows:

| | |
|---|---|
| Cyclohexane, ml | 500 |
| Stearic acid, grams | 100 (0.35 mole) |
| Molybdenum pentachloride, grams | 50 (0.18 mole) |

The materials were charged to the reactor which was then purged with nitrogen for 10 minutes. The temperature was adjusted to 122° F. and maintained at this level for 15 hours. The reactor was then vented, purged with nitrogen for 15 minutes, and the contents were transferred to a vessel for storage. The molybdenum trichloride distearate was soluble in cyclohexane. The calculated molarity of the solution was 0.36.

In the first series of runs, cyclohexane was charged first after which the reactor was purged with nitrogen. Butadiene was added followed by the nickel naphthenate, triethylaluminum, molybdenum trichloride distearate, and finally the boron trifluoride etherate. In the second series of runs the boron trifluoride etherate was added prior to the molybdenum trichloride distearate. Otherwise the order of charging the ingredients was the same. In each series the temperature was adjusted to 122° F. and maintained at this level for 50 minutes.

At the conclusion of each polymerization the reaction was shortstopped with a 10 weight percent solution of 2,2'-methylene-bis(4-methyl-6-tert-butylphenol) in a mixture of equal parts by volume of isopropyl alcohol and toluene. The polymer was coagulated in isopropyl alcohol, separated, and dried. All products were gel free. Data are presented in Table I.

TABLE I

| BF$_3$.OEt$_2$, m.h.m. | Conv., percent | Inh.[1] visc. | Microstructure, percent[2] | | |
|---|---|---|---|---|---|
| | | | Cis | Trans | Vinyl |
| Charge order: Cyclohexane-Bd-Ni-Al-Mo-BF$_3$.OEt$_2$ | | | | | |
| 1.0 | 58.0 | 4.44 | 18.9 | 7.1 | 74.0 |
| 2.0 | 51.5 | 3.69 | 31.8 | 6.6 | 61.6 |
| 3.0 | 37.8 | 2.65 | 51.4 | 5.5 | 43.1 |
| 4.0 | 32.6 | 1.90 | 72.1 | 5.2 | 22.7 |
| 5.0 | 31.6 | 1.61 | 80.4 | 4.0 | 15.6 |
| Charge order: Cyclohexane-Bd-Ni-Al-BF$_3$.OEt$_2$-Mo | | | | | |
| 2.0 | 67.0 | 4.06 | 25.1 | 7.5 | 67.4 |
| 4.0 | 49.0 | 2.29 | 61.2 | 5.6 | 33.2 |
| 5.0 | 50.8 | 1.81 | 72.9 | 4.4 | 22.7 |

[1] Determined according to U.S. Pat. 3,278,508, col. 20, Notes A and B.
[2] Determined according to U.S. Pat. 3,317,503, col. 8, lines 19–44.

These data show that products ranging from predominantly vinyl to predominantly cis were obtained when molybdenum trichloride distearate was present as a fourth component in the catalyst system. As the boron trifluoride etherate level was increased the cis content increased and the inherent viscosity decreased.

EXAMPLE II

The effect of charging molybdenum trichloride distearate and boron trifluoride etherate at various times to a butadiene polymerization conducted in the presence of nickel naphthenate and triethylaluminum was determined. The recipe was as follows:

| | |
|---|---|
| 1,3-butadiene, parts by weight | 100 |
| Cyclohexane, parts by weight | 780 |
| Nickel naphthenate, m.h.m | 1.0 |
| Triethylaluminum, m.h.m | 3.5 |
| Boron trifluoride etherate, m.h.m | 3.5 |
| Molybdenum trichloride distearate, m.h.m | 2.0 |
| Temperature, °F | 122 |
| Time, minutes | 50 |

Cyclohexane was charged to the reactor first. The reactor was then purged with nitrogen and butadiene was added. Nickel naphthenate was introduced followed by the triethylaluminum and boron trifluoride etherate or molybdenum trichloride distearate. The temperature was adjusted to 122° F. for the polymerization. A series of runs was conducted. In runs 1–4 the molybdenum trichloride distearate was added at a different time in each run. In runs 5–6 boron trifluoride etherate was added at different times. All products were gel free. Results were as follows:

TABLE II

| Run | Time (min.) of addn. of— | | Conv., percent | Inh.[1] visc. | Microstructure, percent[1] | | |
|---|---|---|---|---|---|---|---|
| | MoCl$_3$St$_2$ | BF$_3$OET$_2$ | | | Cis | Trans | Vinyl |
| 1 | 20 | | 52.0 | 3.53 | 29.0 | 7.4 | 63.6 |
| 2 | 30 | | 36.2 | 2.12 | 34.5 | 6.6 | 58.9 |
| 3 | 40 | | 26.4 | 1.43 | 42.8 | 5.8 | 51.4 |
| 4 | 50 | | 12.0 | 1.75 | 94.6 | 3.1 | 2.3 |
| 5 | | 10 | 35.0 | 2.61 | 44.2 | 5.8 | 50.0 |
| 6 | | 20 | 42.5 | 3.48 | 28.6 | 6.8 | 64.6 |

[1] Determined according to U.S. Pat. 3,278,508, col. 20, Notes A and B.

These data show that the time of addition of molybdenum trichloride distearate or boron trifluoride distearate have an effect on the microstructure of the product. When the molybdenum component was charged early in the polymerization, the product had a higher vinyl content than when it was added later. When the boron trifluoride dietherate was charged early the product had a higher cis content. In the fourth run the molybdenum component was added just prior to shortstopping the polymerization. The product had a high cis content similar to that obtained with the three-component nickel-based catalyst.

EXAMPLE III

The following recipe was employed for the polymerization of butadiene:

| | |
|---|---|
| 1,3-butadiene, parts by weight | 100 |
| Cyclohexane, parts by weight | 780 |
| Nickel naphthenate, m.h.m. | 1.0 |
| Triethylaluminum, m.h.m. | 5.0 |
| Boron trifluoride etherate, m.h.m. | 5.0 |
| Molybdenum trichloride distearate, m.h.m. | 2.0 |
| Temperature, ° F. | 122 |
| Time, minutes | 183 |

In this run the cyclohexane, butadiene, nickel naphthenate, triethylaluminum, and boron trifluoride etherate were charged in the order named. Polymerization was conducted at 122° F. for 68 minutes after which a sample was withdrawn, shortstopped as in Example I, and conversion determined by evaporating the diluent and drying the polymer. Microstructure was obtained on this sample. The molybdenum trichloride distearate was added to the reaction mixture and polymerization was continued to a total time of 183 minutes. The reaction was then shortstopped, the polymer was recovered as before, and microstructure was determined. Results were as follows:

| Time, min. | Conv., percent | Microstructure, percent | | |
|---|---|---|---|---|
| | | Cis | Trans | Vinyl |
| 68 | 38.8 | 95.4 | 3.1 | 1.5 |
| 183 | 63.0 | 80.6 | 15.3 | 4.1 |

These data show that the composition of the product changed after the molybdenum trichloride distearate was added. As polymerization progressed, the vinyl content increased and the cis content decreased.

EXAMPLE IV

Butadiene was polymerized using the recipe of Example III. In this run the cyclohexane, butadiene, nickel naphthenate, 2 m.h.m. of the triethylaluminum, and the boron trifluoride etherate were charged in the order named. Polymerization was conducted at 122° F. for 60 minutes. The remaining 3 m.h.m. of triethylaluminum and the molybdenum trichloride distearate were added and polymerization was continued for 30 more minutes, or a total of 90 minutes. The reaction was shortstopped and the polymer recovered as in Example I. Inherent viscosity was 2.1. Microstructure of the polymer was as follows:

| | Percent |
|---|---|
| Cis | 76.3 |
| Trans | 4.6 |
| Vinyl | 19.1 |

A control run was made according to the first step of the foregoing run. No additional triethylaluminum and no molybdenum trichloride distearate were added after 60 minutes but the reaction was continued to a total of 90 minutes. Microstructure on this product was as follows:

| | Percent |
|---|---|
| Cis | 96.5 |
| Trans | 2.5 |
| Vinyl | 1.0 |

These data show that the three-component catalyst system gives a high cis polymer.

Ten grams of the polymer containing 76.3 percent cis and 19.1 percent vinyl configuration was dissolved in toluene and analyzed by fractional precipitation. This fractional precipitation procedure involved addition of increments of methyl alcohol to the polymer solution followed by separation of the precipitated polymer after each increment of alcohol was added. A toluene solution of 2,2'-methylene-bis(4-methyl-6-tert-butylphenol) antioxidant was added to the polymer sample (about one part by weight per 100 parts by weight polymer) after which the polymer was dried. Microstructure was determined by infrared analysis in cases where the samples were large enough.

The polymer was separated into 7 fractions. The fractions that separated were in order of decreasing molecular weight. The last fraction did not precipitate but was recovered by evaporation of the solvent. It represented the lowest molecular weight material. No antioxidant was added to this fraction. Results were as follows:

TABLE III

| | | Microstructure, percent | | |
|---|---|---|---|---|
| | Grams | Cis | Trans | Vinyl |
| Fraction: | | | | |
| 1 | 0.15 | (¹) | (¹) | (¹) |
| 2 | 0.37 | | | |
| 3 | 0.33 | | | |
| 4 | 3.4 | 82.1 | 3.3 | 14.6 |
| 5 | 2.52 | 84.0 | 3.4 | 12.0 |
| 6 | 1.54 | 52.7 | 6.4 | 40.6 |
| 7 | 0.97 | 63.7 | 8.3 | 28.9 |

¹ Samples too small for infrared analysis.

Fractions 4 and 5 represent a type of polymer with a much higher cis content and a higher molecular weight than fractions 6 and 7. These data show that the product was a blend of different polymers.

This polymer that was fractionated as described above was also analyzed by gel permeation chromatography. It had a heterogeneity index of 12.4. This value shows that the product had a broad molecular weight distribution. (Heterogeneity index was determined by gel permeation chromatography (GPC) employing a Waters Associates, Inc., Gel Permeation Chromatograph, Model No. 100.)

These data show that the quaternary catalyst systems of this invention give a polymer blend made up of polymers with different microstructures and a wide molecular weight distribution.

It will be evident to those skilled in the art that various modifications of this invention can be made or followed in light of the discussion herein set forth without departing from scope and spirit thereof.

I claim:

1. A quaternary catalyst system comprising (I) a nickel component, (II) an organometallic compound or lithium aluminum hydride, (III) a molybdenum compound, and (IV) a fluoride compound;

wherein said (I) is metallic nickel or a nickel compound capable of being reduced by said (II);

wherein said (II) is:

(a) $R_mAlCl_n$ or (b) $LiAlH_xR_{(4-x)}$ or (c) $R_yM$ wherein R is a saturated aliphatic, saturated cycloaliphatic or aromatic hydrocarbon radical, or combination thereof, containing from 1 to 20 carbon atoms, $m$ and $n$ are integers of 1 or 2 such that $m+n$ equals 3, $x$ is an integer of from 0 to 4, M is lithium, sodium, potassium, rubidium, cesium, beryllium, magnesium, zinc, cadmium, aluminum, gallium, or indium, and $y$ is an integer equal to the valence of said M;

wherein said (III) is:

$$MoX_3[R'—(Z—)_t]_q$$

wherein X is fluorine, chlorine, bromine, or iodine, R'—(Z—) is a mono- or difunctional ligand wherein the functional group —(Z—) is —(CO$_2$—), —(O—), —(S—), or —(N—R'''—), $t$ is an integer of 1 or 2, R' is a saturated or unsaturated aliphatic or cycloaliphatic hydrocarbon radical or an aromatic hydrocarbon radical, or combination thereof, containing from 1 to 30 carbon atoms, and is monovalent when $t$ equals 1 and divalent when $t$ equals 2, R''' is a saturated or unsaturated aliphatic or cycloaliphatic hydrocarbon radical, or an aromatic hydrocarbon radical, or combination thereof, containing from 1 to 12 carbon atoms, $q$ is an integer of 1 or 2 such that $t+q$ equals 3;

wherein said (IV) is boron trifluoride, boron trifluoride-ether complex or hydrogen fluoride;

wherein the amount of said (III) is in the range of from about 1 to 3 moles, the amount of said (IV) is from about 0.5 to 7 moles, and the amount of said (II) is from about 3 to 5 moles, each per gram atom of nickel in said (I) employed.

2. The catalyst of claim 1 wherein said (I) nickel component comprises nickel oxides; nickel salts of inorganic acids; nickel salts of organic acids containing from 2 to 20 carbon atoms; nickel salts of beta-diketones

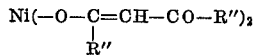

wherein R'' is a saturated aliphatic, saturated cycloaliphatic or aromatic hydrocarbon radical, or combination thereof, and contains from 1 to 10 carbon atoms; and complex nickel compounds.

3. The catalyst of claim 2 wherein said (III) molybdenum compound is molybdenum trichloride distearate, said (I) nickel component is a nickel salt of a fatty acid or naphthenic acid, and said (II) is triethylaluminum, and said (IV) is boron trifluoride etherate.

4. A process for producing a polybutadiene composition possessing broad molecular weight distribution represented by a heterogeneity index of at least 3 in a single polymerization system comprising contacting 1,3-butadiene under polymerization conditions with said catalyst system of claim 1 wherein said (I) nickel component is employed in an amount sufficient to provide from 0.5 to 5 gram atoms of nickel per 100 grams of monomer employed, and recovering said polybutadiene composition.

5. The process of claim 4 wherein said contacting is carried out in the presence of an inert hydrocarbon diluent containing from about 4 to 10 carbon atoms, at a temperature in the range of about −20 to 250° F. and at a pressure sufficient to maintain at least a portion of said 1,3-butadiene in the liquid phase, and wherein said (III) molybdenum compound or said (IV) fluoride compound of said catalyst system is added to said polymerization system after said polymerization has started.

6. The process of claim 4 wherein said contacting is carried out at a temperature in the range of from about 50° to 200° F. and wherein said (III) molybdenum compound of said catalyst system is added after said polymerization has started.

7. The process of claim 4 wherein said catalyst system comprises (I) nickel naphthenate, (II) triethylaluminum, (IV) boron trifluoride etherate, and (III) molybdenum trichloride distearate.

8. The catalyst of claim 2 wherein said (I) is supported on a carrier.

References Cited
UNITED STATES PATENTS

| | | | |
|---|---|---|---|
| 3,170,904 | 2/1965 | Ueda et al. | 260—94.3 |
| 3,232,920 | 2/1966 | Naylor | 260—94.3 |
| 3,446,788 | 5/1969 | Throckmorton et al. | 260—94.3 |
| 3,483,177 | 12/1969 | Throckmorton et al. | 260—94.3 |
| 3,487,063 | 12/1969 | Throckmorton | 260—94.3 |

JOSEPH L. SCHOFER, Primary Examiner

R. A. GAITHER, Assistant Examiner

U.S. Cl. X.R.

252—429, 431, 433